TRANSISTOR OSCILLATOR IDENTIFIER FOR COMMUNICATION SYSTEMS

Filed Oct. 21, 1957

INVENTORS
W. D. GOODALE, JR.
W. PFERD
BY S. E. Hollander
ATTORNEY

United States Patent Office 3,004,105

Patented Oct. 10, 1961

3,004,105

TRANSISTOR OSCILLATOR IDENTIFIER FOR COMMUNICATION SYSTEMS

Walter D. Goodale, Jr., Chatham, and William Pferd, Watchung, N.J., assignors to Bell Telephone Laboratories, Incorporated, New York, N.Y., a corporation of New York Filed Oct. 21, 1957, Ser. No. 691,344

15 Claims. (Cl. 179—6.3)

This invention relates to communications systems and more particularly to the identification of classes of called stations by the oscillation of a characteristic identifying signal in a device connected to the called station.

A persisting problem in the operation of automatic telephone switching systems concerns the identification of collect calls which terminate at coin station telephones and require operator monitoring for the collection of the revenue attributable to the call. On this class of calls the charges are "reversed" i.e., they are paid by the called party and not the calling subscriber, as is usually the case. On a collect call to a coin or pay station, unless the required payment is deposited by the called party, the charges for the call will ordinarily not be collected since coin stations are not billed at regular intervals as are private subscribers.

Thus, the problem to be overcome is ascertaining at the initiation of each collect call whether the called party is a coin station requiring operator monitoring for immediate collection of payment, or a private subscriber whose account may be billed. This situation is, in a sense, unique, since as a general rule in automatic telephony, identification efforts for billing purposes focus on the calling subscriber rather than the called party.

Traffic studies indicate that only a small fraction (2 percent) of collect calls terminate at pay stations. Nevertheless, to identify this small percentage of calls, substantially all collect calls presently undergo a class-of-service check to identify the calls that terminate at pay stations. This check is often performed by the originating operator, who makes a preliminary connection to an information operator at the terminating office. The information operator in turn consults her records to advise the originating operator whether the called station is a coin station.

Automatic identification of the status of called coin station telephones would obviate the necessity for this time-consuming and expensive manual procedure.

It is therefore an object of this invention to provide for automatic identification of particular classes of called stations.

A further object of this invention is the return of a class-of-service identifying signal to the originating operator.

Still another object of this invention is the provision of compact, inexpensive equipment which may be connected to or situated at the called station for the generation of the identifying signal.

A feature of this invention is the utilization of a transistor oscillator circuit requiring no separate power source for the generation of the identification signal.

An additional feature of this invention is the provision of a supply voltage limiting circuit for the oscillator during the period of its oscillation.

Another feature of this invention is the adaptation of the transistor oscillator identifying circuit for operation in response to the lifting of the handset from the cradle at the called station.

These and other objects and features are achieved in one exemplary embodiment by the use of a transistor oscillator which generates an identifying signal when the called telephone (pay station) answers. Energy from the central office battery is utilized to power the oscillator which is connected in shunt with the switchhook contacts of the pay station telephone. A condenser is charged when the line is energized with the switchhook contacts open. When the handset is lifted at the called station the switchhook contacts are closed permitting the condenser to discharge through a Zener diode. Discharge current flowing through the diode provides a temporary limited voltage supply to the oscillator which generates an output signal that is inductively coupled to the telephone line. The originating operator detects the signal to identify the called station as a pay station.

Although switchhook contacts are used in the illustrative embodiment of the invention, it is understood that other means at the subscriber station including operation of dial pulse contacts, insertion of coins, etc. may be used to control the oscillator. Moreover, the oscillator may be connected to and controlled by the contacts of a relay connected to the line at the central office, which relay, in turn, is responsive to a called condition on the line.

The above-related and other objects and features of the invention may be more readily comprehended from the following specification, appended claims, and attached drawing in which:

Figures 1A, 1B, 2, 3A:
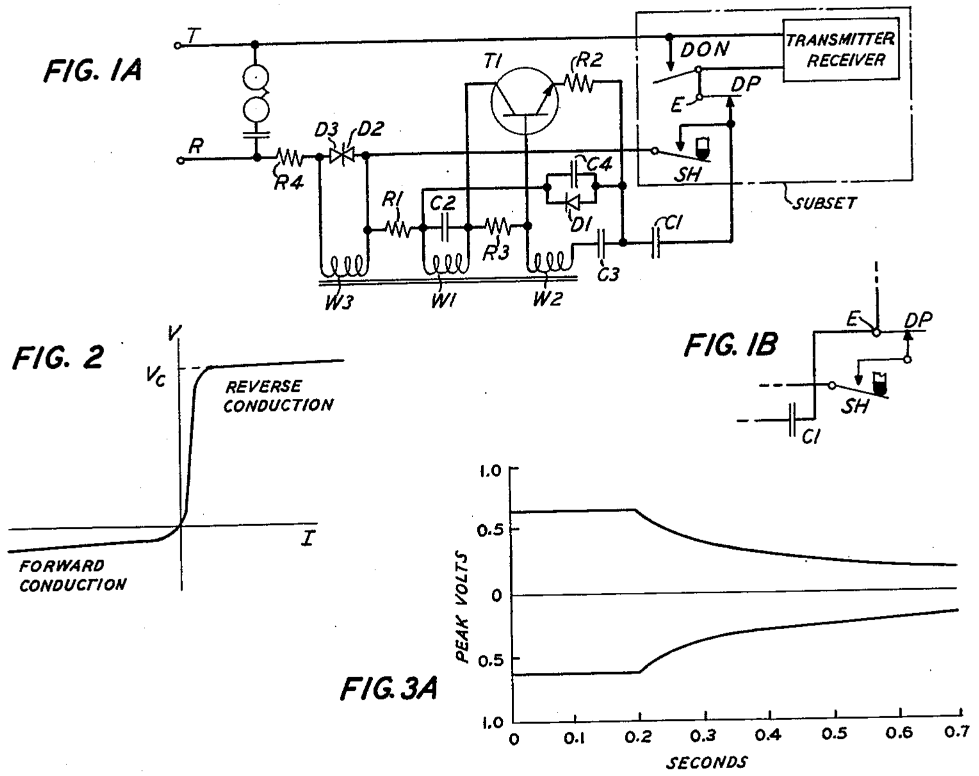
FIG. 1A shows an embodiment of the signal generating circuit comprising a portion of the present invention.
FIG. 1B illustrates an alternative arrangement of a portion of the circuit of FIG. 1A.
FIG. 2 shows the conduction characteristics of an avalanche breakdown diode having a constant voltage region in the reverse conduction direction.
Figures 3B, 4A, 4B:
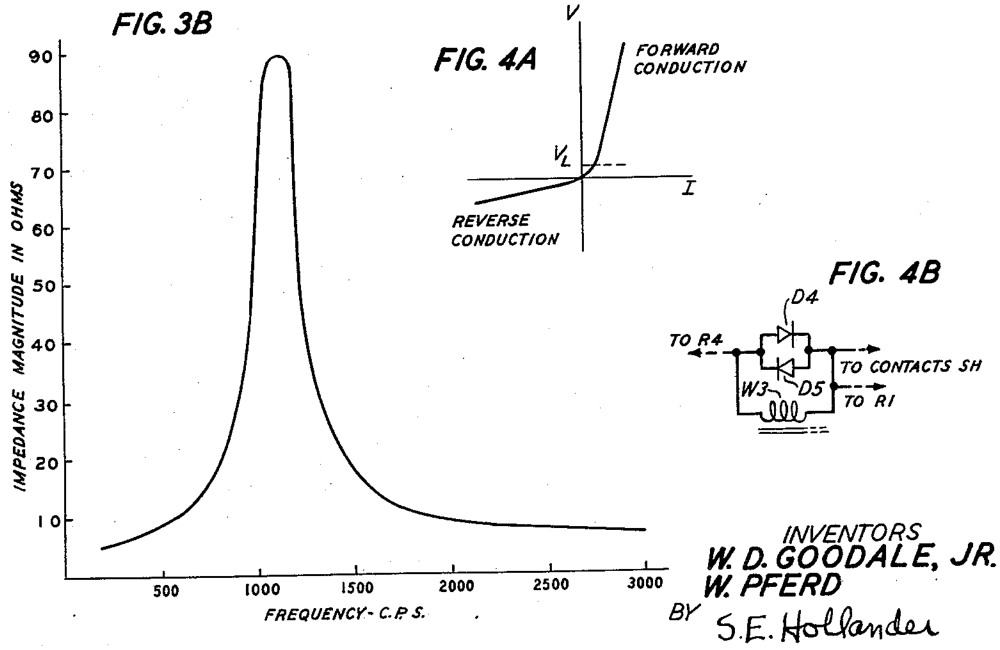

FIG. 3A graphically illustrates the envelope of the oscillatory voltage output of the circuit of FIG. 1A, as obtained across winding W3 thereof;

FIG. 3B shows the alternating-current impedance of winding W3 with the circuit of FIG. 1A in the quiescent state;

FIG. 4A shows the voltage-current characteristics of diodes which may be used as diodes D4 and D5 of FIG. 4B; and FIG. 4B shows an alternative type of protection circuit which may be employed in lieu of diodes D2 and D3 of FIG. 1A.

Referring now to FIG. 1A, an identifying signal generating unit including a transistor and three inductively coupled windings is shown. Resistor R1, diode D1 and capacitor C1 comprise a charging circuit for energizing the transistor oscillator. A protective network including resistance R4 and diodes D2 and D3 guards the circuit against surges and overload.

Contacts SH are provided on the switchhook or cradle mechanism of the subset. When the substation apparatus is normal and not employed in making or receiving calls, contacts SH are open. When a call is initiated or received, however, the contacts SH are closed when the subscriber picks up the receiver or handset.

Dial-off-normal contacts DON are normally open but are closed when the dialing mechanism (not shown) of the substation apparatus is actuated. In accordance with well-known expedients, normally closed dial pulse contacts DP open and close a predetermined number of times during the return portion of the dial travel.

Diode D1 and the pair of oppositely poled diodes D2 and D3 are p-n junction diodes designed to have a low resistance in the forward conduction direction and a high resistance in the reverse conduction direction for voltages not exceeding a critical value, which has sometimes been referred to as the Zener voltage or avalanche breakdown voltage.

For applied voltages, in the reverse conduction direction, greater than the critical value, the diodes exhibit a low resistance or constant voltage characteristic.

For a further discussion of this type of device, reference may be made to an article entitled "Silicon p-n Junction Alloy Diodes," Proceedings of the I.R.E., November 1952, page 1348.

FIG. 2 graphically illustrates the impedance characteristics of diodes D1, D2 and D3. It is noted that in the forward conduction direction the impedance of the diode is very low as indicated by the substantial increase in current for a relatively small applied voltage. The opposite situation applies in the reverse conduction direction; i.e., a high impedance, marked by small increments in current for large changes in the applied voltage, persists until the critical voltage $V_C$ is reached. Thereafter, the impedance falls sharply and the diode enters a substantially constant voltage region.

In operation, when a ringing circuit is connected to the tip and ring loop conductors T and R of FIG. 1 to signal an incoming call, condenser C1 accumulates a direct-current charge during the period that the switchbook contacts SH are open. The charging circuit for condenser C1 may be traced from the tip conductor T through the subset (shown in outline) which comprises the usual telephone substation apparatus including a transmitter and receiver, through the normally closed dial pulse contacts DP of the substation apparatus, capacitor C1, diode D1, resistance R1, winding W3, and resistance R4 to the ring conductor. Assuming for exemplary purposes the values hereinafter set forth for the resistance-capacitance combination R1—C1, in about one-quarter second the voltage of C1 will reach a level adequate for proper operation of the oscillator.

When the contacts SH are closed as a result of lifting the handset from its cradle, capacitor C1 is permitted to discharge over a circuit including the closed switchbook contacts SH, resistance R1 and diode D1. The current from capacitor C1 flows through the diode D1 in the diode's reverse conduction direction and provides a limited potential supply for the identifying signal generator for a short interval of time during which the voltage of condenser C1 exceeds the critical voltage $V_C$ of diode D1. When the voltage of capacitor C1 falls below $V_C$, the voltage supplied to the generator diminishes in exponential fashion.

During the time that the capacitor C1 is supplying current to the generator, a potential is supplied between the collector of transistor T1 and the base thereof. Similarly a potential difference is developed between the base and the emitter of transistor T1.

Specifically, a positive voltage is applied from the left-hand terminal of diode D1 through the parallel arrangement of winding W1 and condenser C2 to the collector of transistor T1, and further through resistance R3 to the base electrode. Simultaneously, a more negative or relatively lower potential is applied to the emitter electrode through resistor R2 from the right-hand terminal of diode D1, thus inducing transistor action and increasing the flow of collector current.

Any variation of the collector current which flows through winding W1 causes regenerative action through feedback winding W2 to the base of the transistor. This disturbance rapidly develops an oscillatory current whose frequency is determined by the circuit constants, and whose amplitude is limited by the value of the voltage supplied to the generator. The oscillations are maintained at a constant amplitude during the short interval of time in which diode D1 is limiting the supplied voltage, and these oscillations diminish thereafter in exponential fashion.

Since windings W1, W2 and W3 and all inductively coupled, the output from winding W1, in addition to being fed back to the base-emitter circuit through winding W2, is also transmitted to the line loop by winding W3. The tone thus impressed on the line conductors is received at the central office and indicates to the operator that the terminating station is a pay station.

As an alternative to the arrangement shown in FIG. 1A, the right-hand electrode of capacitor C1 may be connected directly to terminal E as shown in FIG. 1B, all other connections remaining unchanged. The essential distinction in this arrangement is that the dial pulse contacts are now omitted from the charging circuit but are included in the discharge path. As a result, the identifying signal will be impressed on the line, as described above, when the switchhook contacts are opened by a called party who has intentionally or unintentionally manipulated the dial to a position where the dial pulse contacts DP are open.

FIG. 3A graphically depicts the envelope of the oscillatory output obtained across winding W3 when the circuit parameters hereinafter specified are employed. Initially the peak voltage is approximately constant at 0.6 volt. After 0.2 second, however, when the voltage of capacitor C1 falls below the critical value, the voltage diminishes exponentially.

FIG. 3B illustrates the alternating-current impedance of winding W3 with the oscillator quiescent. At the peak impedance, the transmission loss on a typical loop circuit of 900 ohms impedance is less than 0.5 decibel. At 300 cycles below and above the peak, the loss caused by the identifier is less than 0.2 decibel.

Overvoltage protection for the oscillator is provided by the pair of oppositely poled avalanche breakdown diodes D2 and D3. From the circuit configuration, it is seen that, for voltages not exceeding their critical voltage, one diode is in the forward conducting direction or low impedance state and the other diode is in the high impedance portion of its reverse conduction characteristic.

The serial combination of diodes D2 and D3 provides in effect a relatively high impedance across winding W3 for voltages across winding W3 lower than the critical value.

When the potential across winding W3 exceeds the critical value, both diodes are in their low resistance state and act as a low impedance shunt path across winding W3. Thus the signal generator and winding W3 are protected by the voltage limiting action of diodes D2 and D3.

Alternatively, overvoltage protection may be obtained by using a pair of oppositely poled diodes D4 and D5, each having the characteristics shown in FIG. 4A. These diodes exhibit the usual characteristics of non-symmetrical varistors and they may be distinguished from the breakdown diode discussed above by the lack of a constant voltage region in the reverse conduction direction.

When connected as shown in FIG. 4B the diodes provide a voltage limiting action for voltages in excess of a predetermined level, VL. Voltages exceeding the predetermined level VL cause the diodes to enter a low impedance region thereby limiting the voltage across winding W3.

For exemplary purposes, the parameters of the circuit of FIG. 1, may have the following values:

R1—24,000Ω
R2—500Ω
R3—560,000Ω
R4—15Ω

C1—8 microfarads
C2—0.25 microfarad
C3—0.1 microfarad
C4—0.25 microfarad
W1—100 millihenries, 1200 turns
W2—12 millihenries, 400 turns
W3—2 millihenries, 140 turns, 5Ω D.C.
D1—critical voltage—6 volts—Western Electric 420A or equivalent
D2 and D3—critical voltage—approximately .5 volts—Western Electric 2052 or equivalent
D4 and D5—silicon diodes having characteristics shown in FIG. 4A
T1—Raytheon CK-721 or equivalent.

It is understood that the arrangements and values shown are merely exemplary and that various modifications may be made by those skilled in the art without departing from the spirit or scope of the present invention.

What is claimed is:

1. In a telephone signaling system, a called telephone station identifier including a telephone line, contact means connected to said line, a transistor oscillator connected to said line, a plural winding transformer connected to said oscillator and to said line, and means responsive to the operation of said contact means for energizing said oscillator to transmit an output signal from said oscillator through said transformer to said telephone line.

2. A telephone signaling system called station identifier including a telephone line, a substation including manually operable contact means connected to said line, a transistor oscillator connected to said substation, a plural winding transformer connected to said oscillator and to said line, a pair of oppositely poled unidirectional conducting devices connected to said transformer to limit the voltage applied thereto, and means responsive to the operation of said contact means for energizing said oscillator to transmit an output signal from said oscillator through said transformer to said line.

3. A telephone signaling system called station identifier comprising a telephone line, a substation including manually operable contact means connected to said line, a transistor oscillator connected to said substation, a plural winding transformer connected to said oscillator and said line, a pair of oppositely poled p-n junction semiconductor diodes connected in series across one of said transformer windings, each of said diodes having a low resistance in the forward conduction direction and a substantially constant voltage region in its reverse conduction characteristic for reverse voltages exceeding a critical value, said critical value being equal to or less than the predetermined value of voltage which may safely be applied to said transistor oscillator, and means responsive to the operation of said contact means for energizing said oscillator to transmit an output signal from said oscillator through said transformer to said telephone line.

4. In an automatic telephone switching system called station identifier, a telephone line, a substation including manually operable contact means connected to said line, a p-n junction semiconductor diode, a capacitor, impedance means, said diode, capacitor and impedance means being serially connected across said contact means, said diode having a low resistance in the forward conduction direction and a substantially constant voltage region in its reverse conduction characteristic for applied voltages in excess of a critical value, means for charging said capacitor to a potential exceeding said critical value, and a transistor signal generator connected to said substation, said capacitor being adapted to discharge in response to the operation of said contact means thereby to energize said signal generator and apply an output signal from said signal generator to said telephone line.

5. A telephone switching system called station identifier comprising a telephone line, a substation including manually operable contact means connected to said line, a p-n junction semiconductor diode, a capacitor, impedance means, said diode, capacitor and impedance means being serially connected across said contact means, said diode having a low resistance forward conduction characteristic, a high resistance reverse conduction characteristic for voltages lower than a critical value and a substantially constant voltage region in the reverse conduction characteristic for voltages exceeding a critical value, means for charging said capacitor to a potential exceeding said critical value, a transistor signal generator, and a multiwinding transformer connected to said signal generator and said line, said capacitor being adapted to discharge in response to the operation of said contacts to energize said signal generator and apply an output signal from said signal generator to said line.

6. An automatic signaling system called station identifier comprising a telephone line, a substation including manually operable contact means connected to said line, a transistor signal generator connected to said line, a plurality of p-n junction semiconductor diodes, each of said diodes having a relatively low impedance in the forward conduction direction, a substantially constant voltage region in the reverse conduction direction for voltages in excess of a critical value and a high impedance in the reverse conduction direction for voltages lower than said critical value, said critical value being equal to or less than a predetermined value of voltage which may safely be applied to said transistor signal generator, a capacitor, impedance means, said capacitor, impedance means, and one of said diodes being serially connected across said contact means, means for charging said capacitor to a potential exceeding the critical value of said one diode, a plural winding transformer connected to said signal generator and to said line, said capacitor being adapted to discharge in response to the operation of said contacts to energize said signal generator and apply an output signal from said signal generator to said telephone line, and means connecting at least an additional two of the said diodes in a series-opposed polarity connection across one of said windings.

7. A called telephone station identifier comprising a telephone line, a substation including manually operable contact means connected to said line, a p-n junction semi-conductor diode, a capacitor, impedance means, said diode, capacitor and impedance means being serially connected across said contact means, said diode having a low resistance in the forward direction and a substantially constant voltage region in its reverse conduction characteristic for applied voltages exceeding a critical value, means for charging said capacitor over said telephone line to a voltage exceeding said critical value, and a transistor oscillator connected to said substation, said capacitor being adapted in response to the operation of said contact means to discharge through said diode in the reverse conduction direction thereby to energize said oscillator and apply an output signal from said oscillator to said telephone line.

8. A called telephone station identifier comprising a telephone line, a substation including manually operable contact means connected to said line, a p-n junction semiconductor diode, a capacitor, impedance means, said diode, capacitor and impedance means being serially connected across said contact means, said diode having a low resistance in the forward direction, a high resistance in the reverse direction for voltages below a critical value and a relatively constant voltage region in the reverse direction for voltages exceeding said critical value, means for charging said capacitor over said telephone line to a voltage exceeding said critical value, a transistor oscillator connected to said substation, and a plural winding transformer connected to said oscillator and said line, said capacitor being responsive to the operation of said contact means to discharge through said diode in the reverse conduction direction thereby to energize said oscillator and apply an output signal from said oscillator to said telephone line.

9. A telephone signalling system called station identifier comprising a telephone line, a substation including manually operable contact means connected to said line, a plurality of p-n junction semiconductor diodes, said diodes having a low resistance in the forward conduction direction, a high resistance in the reverse conduction direction for voltages not exceeding a critical value and a substantially constant voltage region in the reverse conduction direction for voltages exceeding said critical value, a capacitor, impedance means, a first of said diodes and said capacitor and said impedance means being connected serially across said contact means, means for charging said capacitor over said telephone line to a voltage exceeding the critical value of said first diode, a transistor oscillator, and a plural winding transformer connected to said oscillator and said line, a second and third of said diodes being serially connected in opposed-polarity across one of said transformer windings, the critical value of said second or third diodes being equal to or less than a predetermined voltage that may be safely applied to said transistor signal generator, said capacitor being operative in response to the closure of said contact means to discharge through said first diode in the reverse conduction direction thereby to energize said oscillator and apply an output signal from said oscillator to said telephone line.

10. An automatic telephone called pay station identifier comprising a telephone line, a substation including manually operable contact means connected to said line, a p-n junction semiconductor diode, a capacitor, impedance means, said diode, capacitor and impedance means being serially connected across said contact means, said diode having a low impedance forward conduction characteristic and a substantially constant voltage region in the reverse conduction characteristic for voltages exceeding a critical value, a transistor oscillator, means connecting the emitter electrode of said transistor to one electrode of said diode, means connecting the base and collector electrodes of said transistors to the other electrode of said diode, and means for charging said capacitor to a potential exceeding said critical value, said capacitor being dischargeably controlled by the operation of said contact means to energize said oscillator and apply an output signal from said oscillator to said line.

11. A telephone signalling system called coin station identifier comprising a telephone line, a substation including manually operable contact means connected in series with said line, a p-n junction semiconductor diode, a capacitor, impedance means, said diode, capacitor and impedance means being serially connected across said contact means, said diode having a low resistance forward conduction characteristic and a substantially constant voltage region in the reverse conduction direction for voltages exceeding a critical value, means for charging said capacitor to a potential exceeding said critical value, a transistor signal generator, means connecting an emitter electrode of said transistor generator to one electrode of said diode, means connecting the collector and base electrodes of said transistor generator through impedance means to the other electrode of said diode and a plural winding transformer connected to said generator and said line, said capacitor being adapted to discharge in response to the operation of said contact means to energize said signal generator and apply an output signal from said signal generator through said transformer to said telephone line.

12. A called telephone coin station identifier comprising a telephone line, a substation including manually operable contact means connected to said line, a plurality of p-n junction semiconductor diodes, said diodes exhibiting a low impedance forward conduction characteristic, a high impedance reverse conduction characteristic for voltages not exceeding a critical value and a substantially constant voltage region in the reverse conduction characteristic for voltages exceeding said critical value, a capacitor, impedance means, a first of said diodes, said capacitor and said impedance means being serially connected across said contact means, a transistor oscillator, means connecting the emitter electrode of said transistor to one of the electrodes of said first diode and means connecting the base and collector electrodes of said transistor to the other electrode of said first diode, a plural winding transformer connected to said oscillator and said line, a second and third of said diodes being connected in series opposition across one of said transformer windings, the critical value of said second and third diodes being equal to or less than a predetermined value of voltage which may safely be applied to said transistor oscillator, and means for charging said capacitor over said telephone line to a voltage exceeding the critical value of said first diode, said capacitor being dischargeably controlled by the operation of said contact means to energize said oscillator and apply an output signal from said oscillator to said line.

13. A called telephone coin station identifier comprising a telephone line, a substation including manually operable contact means connected to said line, a plurality of p-n junction semiconductor diodes, said diodes exhibiting a low impedance forward conduction characteristic, a high impedance reverse conduction characteristic for voltages not exceeding a critical value, a substantially constant voltage region in the reverse conduction characteristic for voltages exceeding said critical value, a capacitor, impedance means, a first of said diodes, said capacitor and said impedance means being serially connected across said contact means, a transistor oscillator, means connecting the emitter electrode of said transistor oscillator to one of the electrodes of said first diode, means connecting the base and collector electrodes of said transistor oscillator to the other electrode of said first diode, a plural winding transformer, a first of said transformer windings connected in series with said line, a second and third of said diodes being connected in series opposition across said transformer winding, the critical value of said second and third diodes being equal to or less than a predetermined value of voltage which may safely be applied to said transistor oscillator, a second of said transformer windings being connected between said base and emitter electrodes, a third of said windings being connected between said collector and emitter electrodes, and means for charging said capacitor over said telephone line to a voltage exceeding the critical value of said first diode, said capacitor being responsive to the operation of said contact means to discharge through said diode in the reverse conduction direction thereby to energize said oscillator and apply an output signal from said oscillator to said line.

14. A telephone signaling system called coin station identifier comprising a telephone line, a substation including manually operable contact means connected in series with said line, a p-n junction semiconductor diode, a capacitor, impedance means, said diode, capacitor and impedance means being serially connected across said contact means, said diode having a low resistance forward conduction characteristic and a substantially constant voltage region in the reverse conduction direction for voltages exceeding a critical value, means for charging said capacitor to a potential exceeding said critical value, a transistor signal generator, means connecting an emitter electrode of said transistor generator to one electrode of said diode, means connecting the collector and base electrodes of said transistor generator through impedance means to the other electrode of said diode, a plural winding transformer connected to said generator and said line, and means responsive to the operation of said contact means for discharging said capacitor through said diode in the reverse conduction direction for energizing said signal generator and applying an output signal from said signal generator to said telephone line.

15. A telephone signaling system called station identifier comprising a telephone line, a substation including manually operable contact means connected to said line, a transistor oscillator connected to said substation, a plural winding transformer connected to said oscillator and said line, a pair of parallel connected oppositely poled p-n junction semiconductor diodes connected across one of said transformer windings, and means responsive to the operation of said contact means for energizing said oscillator to transmit an output signal from said oscillator through said transformer to said line.

References Cited in the file of this patent

UNITED STATES PATENTS

| | | |
|---|---|---|
| 2,729,703 | Faulkner et al. | Jan. 3, 1956 |
| 2,782,259 | Dimond | Feb. 19, 1957 |
| 2,817,710 | Low | Dec. 24, 1957 |
| 2,820,100 | Abbott | Jan. 14, 1958 |
| 2,824,173 | Meacham | Feb. 18, 1958 |
| 2,847,509 | Evers et al. | Aug. 12, 1958 |